(12) United States Patent
Mukherjee et al.

(10) Patent No.: US 9,361,385 B2
(45) Date of Patent: ***Jun. 7, 2016

(54) GENERATING CONTENT FOR TOPICS BASED ON USER DEMAND

(71) Applicant: BloomReach Inc., Mountain View, CA (US)

(72) Inventors: Anindo Mukherjee, Fremont, CA (US); Ashutosh Garg, Sunnyvale, CA (US); Raj K. De Datta, Palo Alto, CA (US); Devesh Senapati, Palo Alto, CA (US)

(73) Assignee: BloomReach Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/472,233

(22) Filed: Aug. 28, 2014

(65) Prior Publication Data

US 2015/0058310 A1 Feb. 26, 2015

Related U.S. Application Data

(63) Continuation of application No. 13/222,860, filed on Aug. 31, 2011, now Pat. No. 8,849,812.

(51) Int. Cl.
*G06F 17/00* (2006.01)
*G06F 17/30* (2006.01)
*G06Q 30/02* (2012.01)

(52) U.S. Cl.
CPC .......... *G06F 17/30867* (2013.01); *G06Q 30/02* (2013.01)

(58) Field of Classification Search
CPC ....... G06Q 30/02; G06Q 10/10; G06Q 50/01; G06Q 10/06; G06Q 30/0224; G06Q 30/0241
See application file for complete search history.

(56) References Cited

U.S. PATENT DOCUMENTS

2005/0223002 A1* 10/2005 Agarwal ........... G06F 17/30864
2007/0239701 A1* 10/2007 Blackman ......... G06F 17/30864

* cited by examiner

*Primary Examiner* — Truong Vo
(74) *Attorney, Agent, or Firm* — Van Pelt, Yi & James LLP

(57) ABSTRACT

Techniques for generating content for topics based on user demand are disclosed. In some embodiments, generating content for topics based on user demand includes determining a topic based on a user demand; automatically generating content for the topic; and selecting the content that is contextually relevant for display within a corpus of content (e.g., a web site, a social networking web page, content customized for mobile devices, content customized based on location awareness, or an electronic mail message).

25 Claims, 9 Drawing Sheets

GENERATING CONTENT FOR TOPICS BASED ON USER DEMAND

CROSS REFERENCE TO OTHER APPLICATIONS

This application is a continuation of co-pending U.S. patent application Ser. No. 13/222,860, entitled GENERATING CONTENT FOR TOPICS BASED ON USER DEMAND filed Aug. 31, 2011 which is incorporated herein by reference for all purposes.

BACKGROUND OF THE INVENTION

Search engines (e.g., web based search engines provided by various vendors, including, for example, Google, Microsoft's Bing, and Yahoo) provide for searches of online information that includes searchable content (e.g., digitally stored electronic data), such as searchable content available via the World Wide Web (WWW). As input, a search engine typically receives a search query (e.g., query input including one or more terms, such as keywords, by a user of the search engine). The search engine performs the search for the search query and outputs results that are typically presented in a ranked list, often referred to as search results or hits (e.g., links or Uniform Resource Locators (URLs) for one or more web pages and/or web sites). The search results can include web pages, images, audio, video, database results, directory results, information and other types of data.

Search engines typically provide paid search results (e.g., the first three results in the main listing and/or results often presented in a separate listing on the right side of the output screen). For example, advertisers may pay for placement in such paid search results based on keywords (e.g., keywords in search queries). Search engines also typically provide organic search results, also referred to as natural search results. Organic search results are based on various algorithms employed by different search engines that attempt to provide relevant search results based on a received search query.

For improved Internet marketing, search engine optimization (SEO) has developed as a form of industry/technical consulting (often referred to as search engine optimizers) provided to web site operators (e.g., vendors of products/services with web sites and/or e-commerce vendors of products/services) for improving the volume or quality of traffic to a web site from a search engine via organic search results (e.g., to improve the web site's web presence as a paid service engagement or pursuant to a marketing campaign). Generally, the higher a web site appears in the organic search results list, the more users it will receive from the search engine. SEO can target different kinds of search, including image search, local search, and industry specific, vertical search engines to improve the web site's web presence. For example, SEO often considers how search engines work and what people search for to recommend web site related changes to optimize a web site (e.g., which primarily involves editing its content and HyperText Markup Language (HTML) coding to both increase its relevance to specific keywords and to remove barriers to the indexing activities of search engines).

BRIEF DESCRIPTION OF THE DRAWINGS

Various embodiments of the invention are disclosed in the following detailed description and the accompanying drawings.

DETAILED DESCRIPTION

Figure 1:
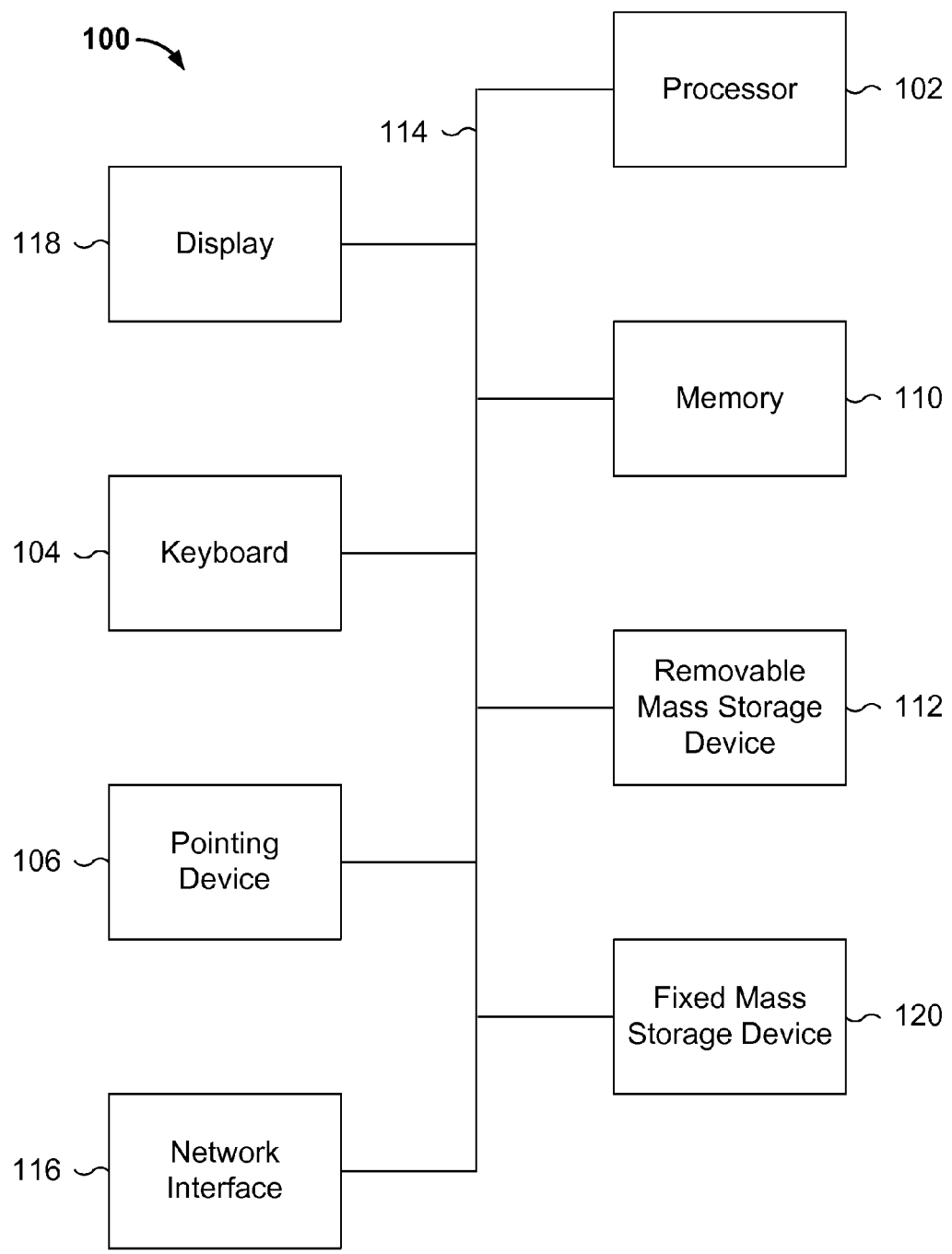
FIG. 1 is a functional diagram illustrating a programmed computer system for generating content for topics based on user demand in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A web site typically includes of a set of interconnected web pages. A web page generally includes content of any of a variety of different types. The content of a web page can include content that is searchable, for example, by a search engine. The content of a web page can also include one or more hyperlinks that provide navigation to other web pages and/or resources. The structure of a web site is generally defined by the hierarchical organization of web pages including the web site as well as the links existing between pages of the web site. It may be desirable to enhance the content and/or structure of a web site, for example, to improve the discoverability of the web site (e.g., for user query/navigation and/or search engine crawling and web page rankings for various queries) and to provide web pages with more relevant information.

Numerous factors can affect the discoverability of a web site and its associated web pages. In some cases, key content associated with a page may not be searchable. At least some of the content of a page may be dynamically generated and provided with a page (e.g., via a JavaScript widget), in response to a user request for the page. For example, some of the dynamic content of a page can be generated client-side (e.g., by a web browser executed on a client device, that is, a user's device). Although dynamic content may be relevant to searches, it is typically not crawlable by search engines. Server-side static content associated with a page may be searchable, but many issues may also arise with respect to the searchable content of a page. For example, the discoverability of the content of a page may be affected by language usage, especially if important content of the page fails to encompass variations that may instead be used to search for or otherwise locate the content. For example, the content of a page may not include all or at least a relevant subset of synonyms of important keywords, terms, or phrases (e.g., table vs. desk); colloquial variations (e.g., cell phone vs. mobile phone); spelling variations (e.g., Hanukkah vs. Chanukah); geographical variations (e.g., Silicon Valley vs. Bay Area); categorical variations (e.g., a clothing merchandise web site that does not categorize men's dress shirts by pattern, such as plaid or pin-striped), and/or various other categorical, ontological, localization, language or grammatical, structural (e.g., pages may be too deep or dynamically generated and, thus, not discoverable by users and/or search engines), and/or other variations that render the web site content, structure, or organization to not be optimized for certain user queries. Moreover, content may not be presented in a manner that is conducive to searches and/or user navigation. Furthermore, a fragmented distribution or organization of content across the pages comprising a web site may result in the web site content not satisfying common search terms or queries. For example, a restaurant web site that indicates on a home or main page that the restaurant serves Japanese food and a San Francisco address but that has on another page a menu that includes sushi may not be provided or at least highly ranked as a search result in response to a user query for "sushi San Francisco." The discoverability of a page may also be affected by the manner in which the page is linked to other pages. For example, a page may not be easily accessible by a search engine or a user if it is too deeply buried or nested within the page hierarchy of a web site.

Various techniques for adding dynamic content (e.g., via JavaScript) to a web page exist. However, such content of a web page is generally not crawlable or searchable and, thus, generally cannot be used by search engines to retrieve and/or rank the web page.

Web site owners typically rely on Search Engine Optimization (SEO) consultants to optimize their web sites and/or associated web pages to make them more amenable for search engine retrieval and/or ranking. However, such SEO consultants generally provide web site content/structural change recommendations that require that the SEO consultants or the web site operator manually modify the content and/or structures of web sites so that the web sites and/or associated web pages can be better located by users and search engines. Such manual changes are static changes based on analysis of the web site at a particular period of time, and thus, such manual changes cannot account for changing user demand for content on the web site.

What is needed is content generation for topics based on user demand. Accordingly, techniques for generating content for topics (e.g., themes and/or sub-themes) based on user demand are disclosed. For example, the techniques described herein can significantly enhance the content and/or discoverability of existing content of a web site (e.g., for an entity or for a brand) and its associated pages as well as make the web site and its associated pages more amenable to various third party services (e.g., search engines) by providing richer content on pages and/or improved navigation to pages. Although some of the given examples are described with respect to web pages of a web site, the techniques disclosed herein can be employed with respect to any other organization of a corpus of content whose content is desired to be improved to facilitate enhanced content for topics based on user demand (e.g., web content and/or other forms of content, such as e-mails, content for mobile devices, such as for web pages for mobile devices or for applications for mobile devices, and/or content customized based on location awareness). For example, a corpus of content can include a web site, a user's social networking web page, content customized for mobile devices, content customized based on location awareness, an electronic mail message, and/or any other collection of digitally stored content.

In some embodiments, content for topics, such as for themes or related themes or sub-themes (e.g., thematic pages) facilitate a web site capturing traffic for new category-like/torso and tail query traffic (e.g., which are queries that can be dynamically changing over time), through the generation and delivery of optimized (e.g., high user-value and search-engine friendly) landing pages that enhances, for example, a web site content and/or structure to enable discovery of the web site's relevant content that corresponds to such category-like/torso and tail query traffic.

For example, a merchandise web site for clothing merchandise can be enhanced include various new thematic pages that include optimized content for a user's request to view merchandise corresponding to a query for a "blue pin-striped men's dress shirt" (e.g., even if the merchandise web site does not otherwise categorize its dress shirt merchandise by patterns), using various techniques described herein. As another example, a furniture web site can be enhanced to include thematic pages for leather chair as a theme and also include refinements or sub-themes for leather theatre seat, leather club chair, leather ottoman, and/or various other sub-themes or refinements, using various techniques described herein. As yet another example, a travel web site that does not include a static page for flights from San Francisco to New York City can be enhanced to include a thematic page for flights from San Francisco to New York City and/or various other travel patterns or sub-themes related to such travel patterns (e.g., hotels in New York City or car rentals in New York City), using various techniques described herein.

Thus, using various techniques described herein can provide for enhanced capture of natural language queries from users (e.g., queries of users at search engines and/or search queries from users while users are navigating within the web site, such as using the search option of the web site). Using various techniques described herein can also provide for enhanced web site content to allow for bidding for keywords for landing pages. Using various techniques described herein can also improve a web site's structure and expand the web site's content and structure, which can thereby improve organic search results for the web pages of the web site.

In some embodiments, thematic pages (e.g., landing pages for a given theme or topic or sub-topic or refinement) are generated dynamically based on user demand (e.g., observed user demand over time and/or in anticipation of user demand). For example, content that reflect a user's behavior (e.g., based on the user's behavior on or off the web site) and that is based on the web site's content can be created (e.g., as needed, depending on the existing content of the web site and based on a dynamic monitoring of user activities, such as user queries, user navigation within the web site, user's interest in particular content of the web site, user's search/query activities on other web sites such as search engines, user's activities on social networks, and/or other monitored user activities).

In some embodiments, thematic pages optimize torso queries and/or tail queries by, for example, automatically generating optimized or enhanced content for the web site to attract queries for which the web site does not have adequate landing pages. In some embodiments, the topic or theme is a category-like/torso query that has high search volume potential, but for which the web site does not have a relevant existing web page. For example, products and other content presented on the thematic page can be highly related and relevant to the main theme. In some embodiments, the sub-topic or sub-theme is a tail query that has high search volume potential, but for which the web site does not have a relevant existing web page.

In some embodiments, thematic page content includes the following: a heading or theme; one or more sub-themes (e.g., each sub-theme can be a targeted query and include, for example, a list of products or services), widgets showing more products or services, and related themes or related searches. In addition to the above, product content can also include a list of related queries and product/service description, title, and image.

In some embodiments, generating content for topics based on user demand includes determining a topic based on a user demand; automatically generating content for the topic; and selecting the content that is contextually relevant for display within a corpus of content. In some embodiments, the content is optimized for the topic. In some embodiments, the corpus of content includes web content (e.g., a web site), social content (e.g., a user's social networking web page), content optimized for mobile devices (e.g., content customized for mobile devices), content optimized for location (e.g., content customized based on location awareness), or an electronic mail message (e.g., e-mail).

In some embodiments, the content is displayed in a module of a corpus of content that includes a plurality of modules, in which each module includes dynamically generated contextually relevant content. Example modules can include a Related Searches module, a Most Popular Products module, a Recent Viewed Products module, a Your Friends Have Seen module, a Refinements/Related Products module, and/or various other modules. In some embodiments, a web site page can be structurally organized to include one or more modules, in which each module includes dynamically generated contextually relevant content using various techniques as described herein. In some embodiments, a module can be provided for content that is delivered using mechanisms external or independent of the web site, such as using e-mail sent to one or more users or using mobile apps executed on user mobile devices (e.g., smart phones, tablets, laptops, and/or other mobile computing devices).

In some embodiments, selecting the content that is contextually relevant for display with a corpus of content further includes determining the content based on a source of the user (e.g., a point of origin of the user, such as whether the user is performing a web search, using a social network, using electronic mail, using a mobile application (app), and/or any other point of origin of the user).

In some embodiments, selecting the content that is contextually relevant for display with a corpus of content further includes determining the content based on a temporal element (e.g., day-part, week-part, holiday, and seasonality). In some embodiments, selecting the content that is contextually relevant for display with a corpus of content further includes personalizing the content based on user related data. For example, user related data can include user search history, user purchase history, user device preference, user presentation preferences, content generated using pixel log related data, user reviews, social networking related data (e.g., your friends looked at this), visited information, and/or any other user related data.

In some embodiments, selecting the content that is contextually relevant for display with a corpus of content further includes determining a placement of the content for integration with a structure or organization of the corpus of content. For example, the contextually relevant content can be integrated into various existing structures of the corpus of content (e.g., using various different modules, and possibly various different link structures for a web site) and/or integrating into off-site content, such as e-mail, mobile app, and/or social content. In some embodiments, the corpus of content includes a web site, in which the content includes web page content that is configured or organized differently than on other web pages of the web site. In some embodiments, the corpus of content includes a web site, and the content includes contextually relevant data that does not exist on other web pages of the web site. In some embodiments, for a given topic (e.g., theme or sub-theme), a multitude of modules of contextually relevant content can be generated based on the topic. In some embodiments, a selection of modules is automatically configured based on contextual relevancy (e.g., based on a source of a user, user behavior on the web site and/or off the web site, and/or where the user is accessing or viewing the module(s), such as web browsing, e-mail, social network, mobile device, and so forth).

In some embodiments, the content is selected for display in a plurality of modules (e.g., Related Searches module, a Most Popular Products module, a Recent Viewed Products module, a Your Friends Have Seen module, a Refinements/Related Products module, and/or various other modules), and generating content for topics based on user demand further includes displaying performance metrics associated with each of the plurality of modules, in which each of the plurality of modules can be configured or automatically removed based on the performance metrics. In some embodiments, each of the plurality of modules is automatically modified based on the performance metrics. For example, configuration settings can be selected to automatically decrease or stop using a module or set of modules based on certain performance metric results, such as based on threshold settings or performance over a period of time criteria, and/or any other settings or criteria. In some embodiments, a charge is determined for using each of the plurality of modules based on the performance metrics associated with each of the plurality of modules.

In some embodiments, generating content for topics based on user demand further includes analyzing a set of search queries to determine the topic based on the user demand, in which the set of search queries include a log of search queries for the web site. In some embodiments, generating content for topics based on user demand further includes analyzing an external data source to determine the topic based on the user demand, in which the external data source includes social networking resources associated with the web site and includes social networking resources that include content that is similar to content included on the web site. For example, twitter stream or other social data for popular shoes can be analyzed to determine thematic page content for a shoe manufacturer. As another example, twitter stream data or other social data (e.g., Facebook® pages or Google+® pages) for a famous cyclist or for a famous cycling event can be analyzed to determine thematic page content for a cycling manufacturer. As yet another example, twitter stream data or other social data (e.g., Facebook® pages or Google+® pages) that include content related to a brand or an entity (e.g., which may or may not be owned, managed, or otherwise associated with controlled by the brand or the entity) can be analyzed to determine thematic page content for the brand or the entity.

In some embodiments, generating content for topics based on user demand further includes analyzing user behavior to determine topics based on user demand, in which the analyzed user behavior includes user search behavior performed on other web sites (e.g., user queries on search engines).

In some embodiments, the corpus of content includes a web site, in which a landing page of the web site includes the content, and generating content for topics based on user demand further includes generating a plurality of configuration of modules for the topic for the web site, in which each of the plurality of configuration of modules is optimized for a referring source of user and a display device type (e.g., and/or other variables, such as location, day part, and seasonality, operating system (OS) type, an so forth). For example, a thematic page for a topic, such as cycling shoes for men or any other topic based on user demand, can be different based on the user source, such as whether the user is coming from the Google® web site, e-mail, or the Facebook® web site.

In some embodiments, the corpus of content includes a web site, in which a landing page of the web site includes the content, and generating content for topics based on user demand further includes adding a link on the web site for the topic, in which the link is associated with the landing page, and in which the link is crawlable by a web crawler.

In some embodiments, generating content for topics based on user demand further includes automatically anticipate the user demand (e.g., using various techniques described herein, such as based on current events, dates, special dates associated with a user such as birthdays or anniversaries, seasons and/or holidays, a scheduled or anticipated event such as a major sporting event or major entertainment event, and/or various other criteria, parameters, and/or techniques).

In some embodiments, generating content for topics based on user demand includes determining a topic based on a user demand; and automatically generating a landing page for the topic for a web site. In some embodiments, generating content for topics based on user demand further includes determining that the web site does not include existing web page content for the topic; and automatically generating the landing page for the topic for the web site using new externally generated web page content. In some embodiments, the landing page includes web page content that is optimized for the topic. In some embodiments, the landing page includes web page content that exists on other web pages of the web site. In some embodiments, the landing page includes web page content that does not exist on other web pages of the web site.

In some embodiments, generating content for topics based on user demand further includes analyzing a set of search queries to determine the topic based on the user demand, in which the set of search queries include a log of search queries for the web site. In some embodiments, generating content for topics based on user demand further includes analyzing an external data source to determine the topic based on the user demand, in which the external data source includes social networking resources associated with the web site (e.g., a Facebook® account or Twitter® account associated with the web site).

In some embodiments, generating content for topics based on user demand further includes generating a plurality of versions of the landing page for the topic for the web site, in which each of the versions of the landing page is optimized for a display device type or operating system type (e.g., a version for each of the following a PC browser; a tablet, such as an Apple iPad®; and a mobile phone, such as an Apple iPhone® mobile phone or a Google Android® based mobile phone).

In some embodiments, generating content for topics based on user demand further includes adding a link on the web site for the topic, in which the link is associated with the landing page, and in which a web crawler can crawl the link.

In some embodiments, generating content for topics based on user demand includes receiving a user request for a topic at a web server for a web site, in which the topic is indicated as a linked topic on a web page of the web site; determining the topic based on the request; sending a server request for a web page for the topic to a third party server; receiving the web page for the topic from the third party server; generating the web page for the topic; in which a source of the web page for the topic is transparent to a web crawler. In some embodiments, the server request is communicated using an application programming interface (API). In some embodiments, generating content for topics based on user demand further includes sending the web page for the topic to the requesting user browser. In some embodiments, generating content for topics based on user demand further includes caching the web page for the topic for a period of time or until an event occurrence.

FIG. 1 is a functional diagram illustrating a programmed computer system for generating content for topics based on user demand in accordance with some embodiments. As shown, FIG. 1 provides a functional diagram of a general purpose computer system programmed to perform generating content for topics based on user demand in accordance with some embodiments. As will be apparent, other computer system architectures and configurations can be used to perform context sensitive script editing for form design. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide the various computer/computer implemented functional elements described below with respect to FIGS. 2, 7, and 8 and/or executes/performs the processes described below with respect to FIGS. 3 through 6 and 9.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized (e.g., server devices, appliances with hardware configures for specific functions, such as a web server or an application server, and/or various other types of computing devices that can execute various operating systems and/or virtual machine software techniques).

Figure 2:
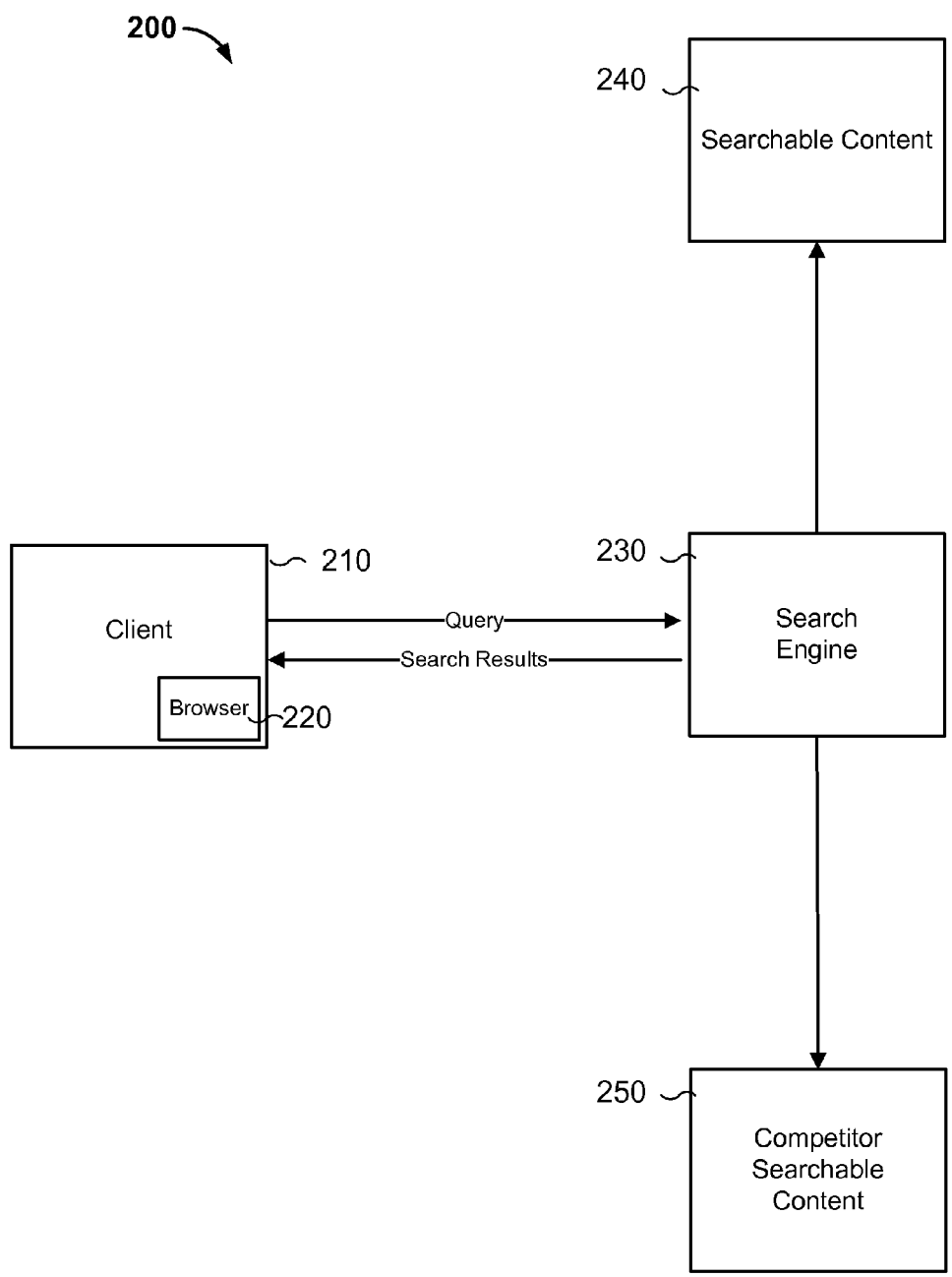
FIG. 2 is a functional diagram illustrating network based search in accordance with some embodiments.

FIG. 2 is a functional diagram illustrating network based search in accordance with some embodiments. For example, the Internet and, in particular, the World Wide Web (WWW), includes searchable content located on various computers, servers, and network appliances (e.g., web servers/appliances). Web browsers, such as web browser 220, provide client software executed on a computer, such as client 210, for accessing searchable content (e.g., web pages) on the WWW, such as searchable content provided by a server 240 (e.g., Nike's web site) and/or competitor searchable content provided by a server 250 (e.g., Adidas' web site). As shown in FIG. 2, the client computer 210 submits a query to the search engine 230 and receives search results back from the search engine 230 (e.g., Google's search engine, Yahoo' search engine, Microsoft's Bing search engine, or another search engine). The search engine 230 provides search results based on the query received from the client 210. The search engine 230 typically crawls various searchable content on the network, (e.g., crawlable content on WWW sites) including searchable content 240 and 250 to identify relevant searchable content (e.g., to update an index of available searchable content). The search engine 230 typically provides natural or organic search results based on the query and, in some cases, can also provide paid search results (e.g., based on paid keywords in the query submitted by the client 210 or based on other techniques). As will be appreciated by those of ordinary skill in the art, various network architectures and software/computing solutions are available for providing network based search. In some embodiments, generating content for topics based on user demand can be used, for example, by a web site operator providing searchable content 240 by providing various modules for topics based on user demand in which each module includes dynamically generated contextually relevant content as described herein using various techniques. For example, modules based on a topic can be generated that include links added to new landing pages for the topic on a one or more HTML pages of the web site providing the crawlable and searchable content 240 (e.g., in a module for providing related searches, a module for related topics, and/or a module for related themes, which can be presented in a sub-section of the web page, in which the web page can be divided to provide for including one or more such modules).

Figure 3:
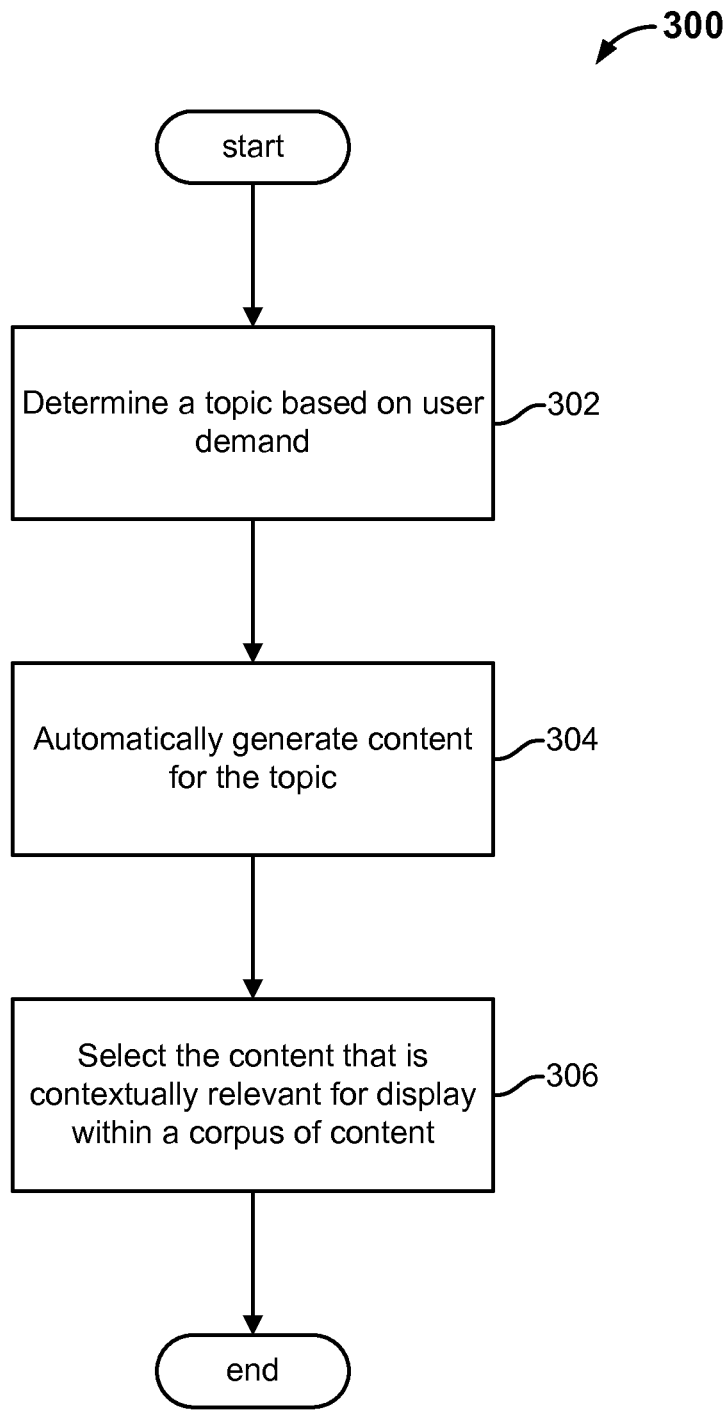
FIG. 3 is a flow diagram for generating content for topics based on user demand in accordance with some embodiments.

FIG. 3 is a flow diagram for generating content for topics based on user demand in accordance with some embodiments. At 302, a topic (e.g., theme or sub-theme) based on user demand is determined. In some embodiments, user demand is determined by analyzing user activities on the web site and/or user activities off of the web site. For example, the topic can be determined by analyzing search query logs for the web site (e.g., millions of user queries for the web site) and/or analyzing search query logs for search engines (e.g., millions of user queries on one or more search engines. The search query logs are analyzed to identify common sets of terms and phrases that describe a set of products (e.g., similar techniques can be applied to other data sources, such as social network related sources that may or may not be associated with the web site, as discussed herein). Once these phrases are identified, these phrases can then be passed through an inverse search engine that includes, for example, a series of scoring and filters to identify terms or phrases of interest (e.g., a high frequency of certain terms or phrases, which score relatively highly using various scoring and filtering techniques, can be indicative of user demand); and such terms or phrases that are high scoring and non-duplicative of the web site's existing content can then be selected and launched as topics using various techniques described herein. For example, referring to the furniture web site example, the query search logs can be analyzed to determine that there is a high frequency of bi-grams that include the terms "leather" and "chair" (e.g., "leather arm chair", "reclining leather chair", and so forth). By extracting topics/sub-topics (e.g., themes/subthemes) based on query/product matching analysis can identify matching words in queries to generate new potential themes/sub-themes, such as leather chair/leather reclining chair). The themes can be sorted based on common words, and then clustered (e.g., using a min hash clustering, n-squared clustering based on bi-grams, or using various other clustering techniques) to generate potential queries of interest. Also, sub-themes using word match or based on common products matching such queries and, in some cases, can further determine if a user issues a refinement search based on session data (e.g., session ID, referring URL, referring query, and/or time stamp for every log, which allows for this type of determination/extraction that user first searched for leather chair than searched for reclining leather chair). Next, products that match leather chair (e.g., p1, p2, p3, . . . , pn, etc.) can be determined, and then page content, name of product, tags, users landed on page and stayed for a period of time can be determined. In some cases, these themes/sub-themes can further be filtered based on whether the web site is determined to have adequate existing content/structure (e.g., if not, then a new landing page for the theme/sub-theme can be generated to extend the web site to include the new thematic landing page to thereby enhance the web site's structure and/or content for the theme).

In some embodiments, web pages based on product and attribute information are generated using various techniques as described herein. For example, for each product on a web site, product names can be analyzed to extract various attributes (e.g., colors, size, units, and/or other attributes) and product names. In some embodiments, extracting such attributes is determined by issuing various queries against a product index for the web site; two products are deemed similar if they match a threshold number of queries; for each pair of similar products, common strings are extracted; among the extracted strings, known attributes such as colors, units, size, and/or other attributes are extracted; in the remaining string, the longest matching string at the highest position is determined to be the product name; and everything else is indicated as attributes. For each product-attribute pair, the number of matching products is computed. If the number of matching products exceeds a specified threshold value, a page is created for this product-attribute pair. For example, for a running gear web site, for the products: "All-weather Men's Running Shoes" and "Comfortable Nike Men's Running Shoes", various attributes can be extracted, such as "Canvas", "Comfortable", "All-weather", "Nike" can be extracted as attributes and "Men's Running Shoes" can be determined to be the product. In this example, web pages based on product and attribute information such as the following can be generated: "Comfortable Men's Running Shoes" and "Canvas Men's Running shoes."

In some embodiments, ontology based pages are generated using various techniques as described herein. In some embodiments, the navigational content of a web site (e.g., menus, breadcrumbs, refinements etc) are scraped. For each of these scraped elements, the number of matching products is computed. If the number of matching products is large enough (e.g., exceeds a threshold value), a page is generated for this element. For example, if a given web site has a category page for "Dishwashers", and the refinements on the page are Color and Brand, then generated new pages can include, as examples, the following: "Gray Dishwashers" and "Kenmore Dishwashers."

In some embodiments, structured content based pages are generated using various techniques as described herein. As an example, a web site's content is structured into units. Each unit can either be a single piece of information, a class of information, or a collection of information. Units can then be analyzed to compute as to how relevant they are to other units. This process can be manual or can be automated. If the above frequencies are high, the units can be paired together. Blocks of such units can now form a page, after incorporating some other meta information. For example, a web site can have units of information, such as "Flights from LA to NY", "Hotels near Chicago airport", "Bus from LA to SFO", "Car Rentals near SFO airport", etc. After analyzing the web site, "Flights from X to Y" can be determined to be relevant to "Car rental near Y" and "Hotels near Y airport", but determined to not be relevant to "Hotels near X airport" or "Bus from X to Y". As a result, a page can be generated about "Flights from X to Y" with the determined relevant information.

At 304, content for the topic is automatically generated. At 306, the content that is contextually relevant for display within a corpus of content is selected. In some embodiments, a potential query is discarded, because the web site is determined to not have sufficient content to generate a new landing page for the query (e.g., in some cases, if a query meets a certain threshold, but the web site lacks sufficient content to generate a landing page for the query, then a notification can be sent to the web site owner and/or a log can be generated to indicate this determination, thus allowing the web site owner to potentially develop content for adding to the web site to manually add a page or to allow the techniques described herein to automatically generate a new landing page for a theme corresponding to such newly added web site content based on the query).

Figure 4:
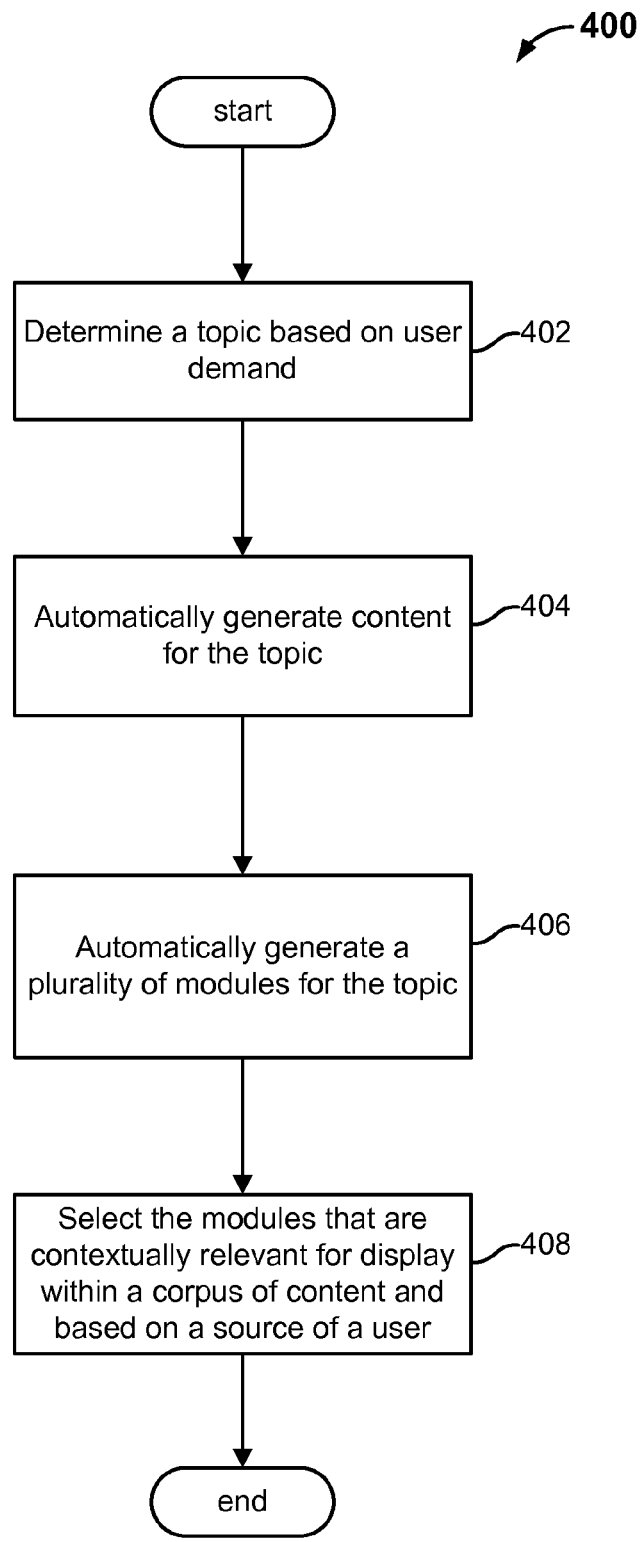
FIG. 4 is another flow diagram for generating content for topics based on user demand in accordance with some embodiments.

FIG. 4 is another flow diagram for generating content for topics based on user demand in accordance with some embodiments. At 402, a topic (e.g., theme or sub-theme) based on user demand is determined. At 404, content for the topic is automatically generated. At 406, a plurality of modules for the topic is automatically generated. At 408, the content that is contextually relevant for display within a corpus of content is selected.

Figure 5:
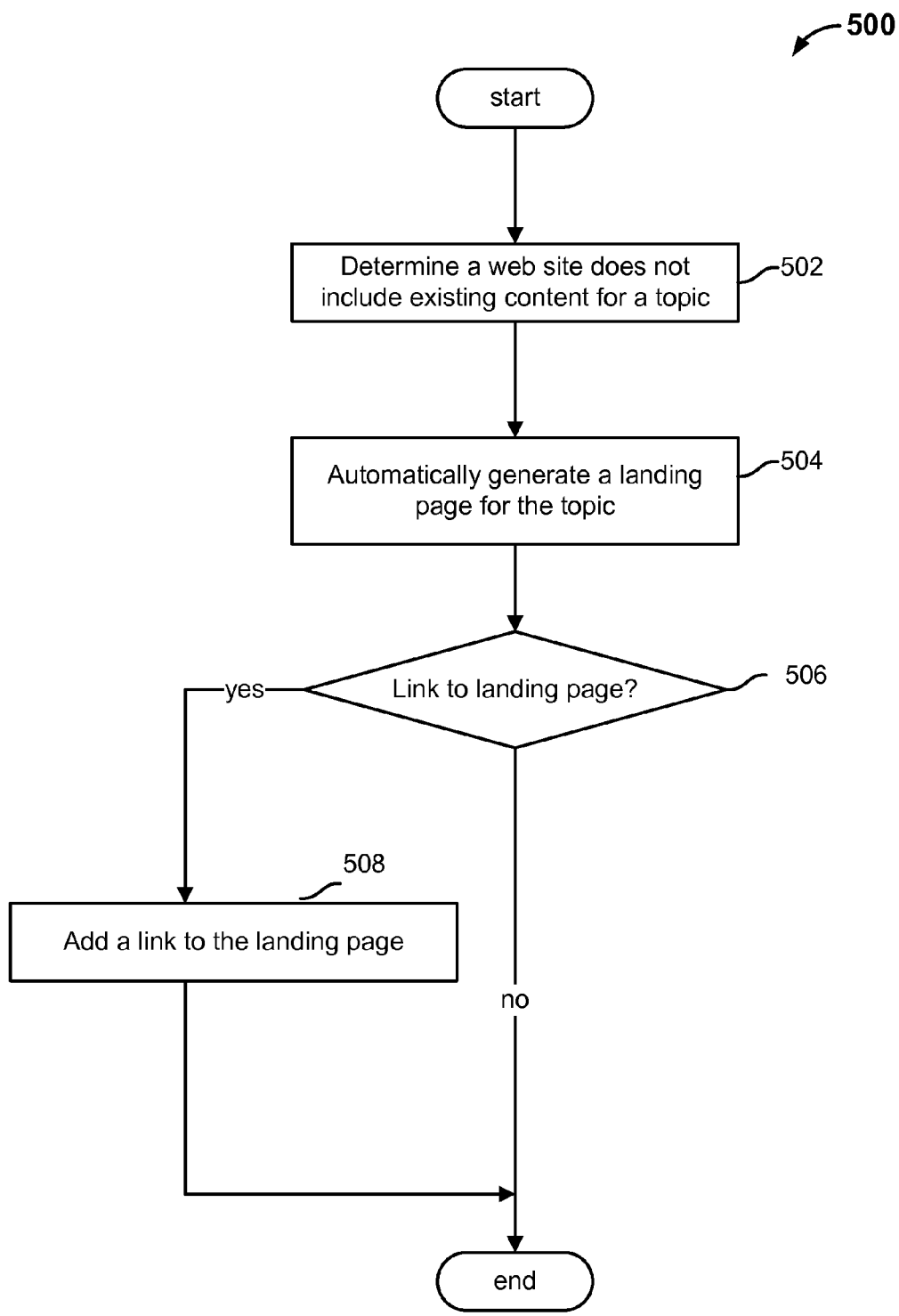
FIG. 5 is another flow diagram for generating content for topics based on user demand in accordance with some embodiments.

FIG. 5 is another flow diagram for generating content for topics based on user demand in accordance with some embodiments. At 502, that the web site does not include existing web page content for the topic is determined. At 504, a landing page for the topic is automatically generated for the web site (e.g., which can be provided as a module for the topic, as a new web page for the topic, and/or as new content for the topic for an existing web page). At 506, whether to link the new landing page for the topic is determined. For example, a network administrator can be contacted to confirm whether or not to add the link to the new landing page. As another example, a network administrator can be contacted, and if no response is received (e.g., within a predetermined period of time), the link to the new landing page can automatically be added to the web site, or alternatively, if no response is received, the link to the new landing page will not be added. As yet another example, an automatic workflow process for approval of adding such new landing pages that include externally generated web page content can be executed. At 508, assuming it is determined that the new landing page should be added to the web site, a link is added to the landing page from the web site.

Figure 6:
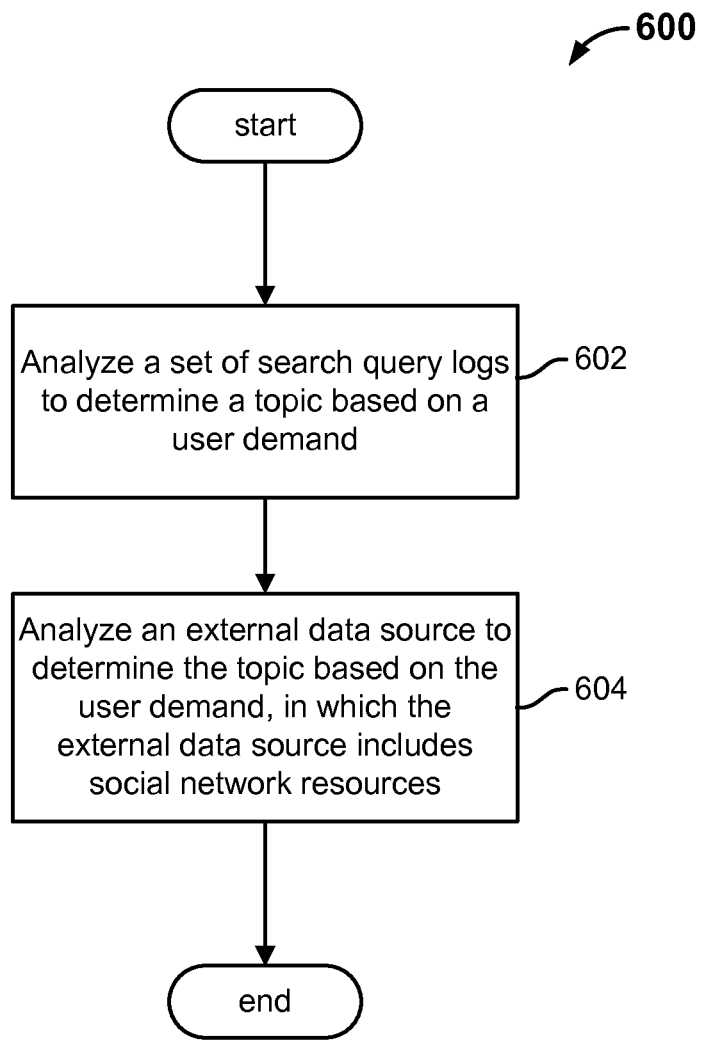
FIG. 6 is another flow diagram for generating content for topics based on user demand in accordance with some embodiments.

FIG. 6 is another flow diagram for generating content for topics based on user demand in accordance with some embodiments. As discussed above, user demand can be determine using various techniques described herein. At 602, a set of search query logs (e.g., search query logs associated with a web site) are analyzed to determine a topic based on the user demand. At 604, an external data source is analyzed to determine the topic based on the user demand. For example, the external data source can include social networking resources (e.g., social networking resources associated with the web site and includes social networking resources that include content that is similar to content included on the web site) and/or other external data sources. As another example, the external data source can include search engine search query logs. In some embodiments, user related data is analyzed to determine user demand and/or to determine contextually relevant content for a given user. For example, user related data can include user search history, user purchase history, user device preference, user presentation preferences, content generated using pixel log related data, user reviews, social networking related data (e.g., your friends looked at this), visited information, and/or any other user related data.

Figure 7:
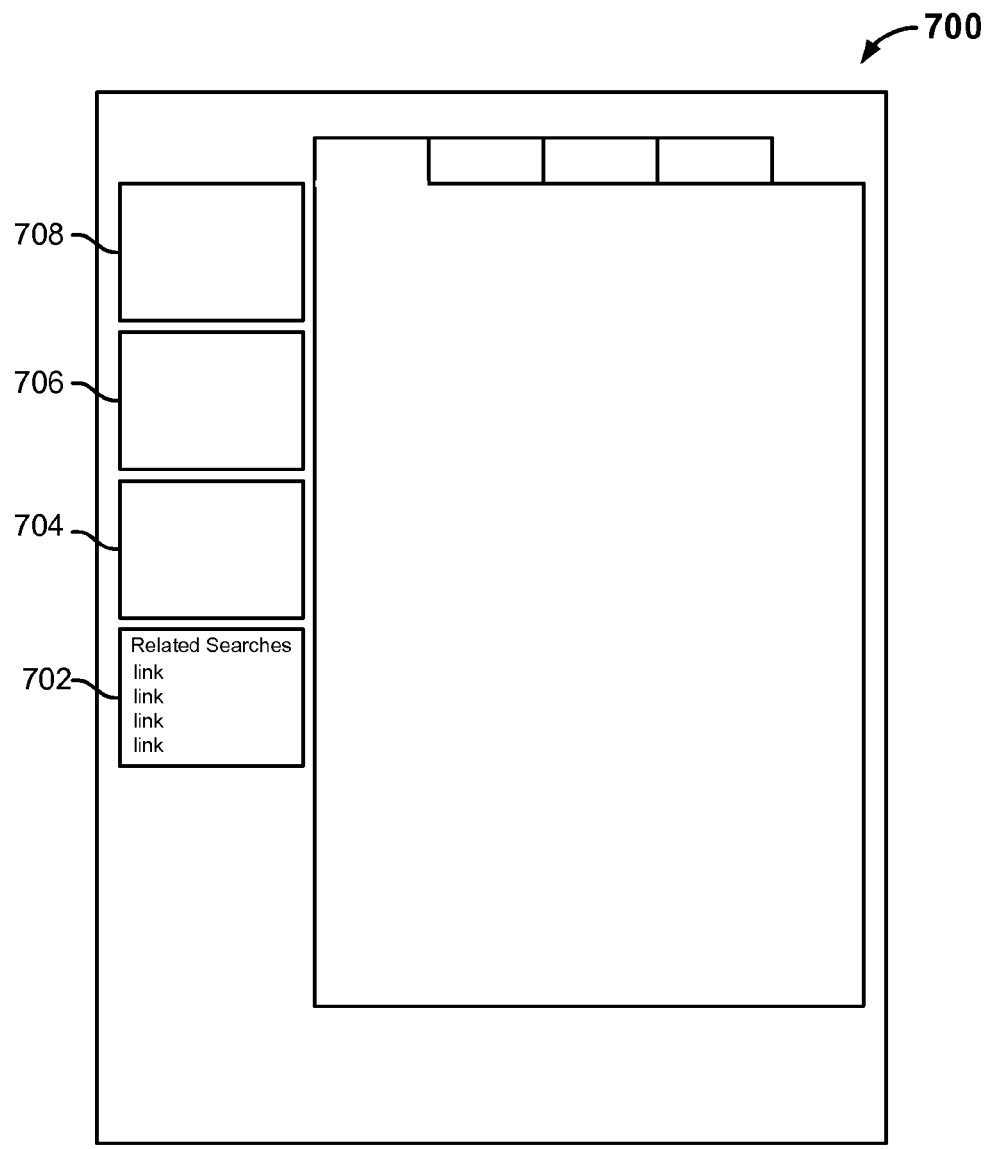
FIG. 7 is a functional diagram illustrating a web page including links to topics based on user demand in accordance with some embodiments.

FIG. 7 is a functional diagram illustrating a web page including links to topics based on user demand in accordance with some embodiments. As shown, a web page 700 includes a "Related Searches" sub-section or sub-window 702, which includes links. In some embodiments, the Related Searches sub-section 702 includes links, in which at least some of the links include links to landing pages for topics or themes. In some embodiments, links to landing pages are included in other sections 704, 706, and 708 (e.g., Related Topics or Related Sub-Topics or Related Searches) or integrated into various pages of corpus of content of a web site.

In some embodiments, various modules are automatically generated for a topic or sub-topic (e.g., a theme or sub-theme). For example, the modules can be selected to provide contextually relevant content (e.g., based on the web site, a source of a user, a device being used by the user, and so forth) and can provide an optimal landing page for user queries that are not otherwise optimally captured by the web site's existing content or structure. In some embodiments, various modules are provided that provide the content for the topic (e.g., a Related Searches module, a Most Popular Products module, a Recent Viewed Products module, a Your Friends Have Seen module, a Customer Favorites module, a Refinements/Related Products module, and/or various other modules).

In some embodiments, the customer favorites module presents the highest ranking products that match the main theme (e.g., based on scoring techniques as described herein). For example, the customer favorite's module facilitates the display of product assortments that are most relevant to the theme and expected to generate a significant portion of user clicks. Also, search engines can crawl this content, which generally facilitates improved indexing and eventually ranking of the product pages linked, based on the optimized keywords present in the content. In some embodiments, these products are computed by analyzing user click behavior and combining that with relevancy rating to create a score. If the site has more information about products (e.g., ratings, reviews, and/or other information about products), this data will also be used to compute the product's relevancy score.

In some embodiments, the top refinements module presents a set of queries (e.g., or sub-themes) that are highly relevant refinements to the base theme or main theme. For example, the sub-themes improve user navigation, providing users with commonly used additional options for the broad theme that they are exploring. Also, sub-themes and their associated content can generally improve keyword density and increase search engines' access and crawling of more keywords for the base theme than would be present on an existing product or category page. In some embodiments, sub-themes are computed by determining relatedness of the sub-theme to the base theme and analyzing user click data and behavior. For example, sub-themes can be generated and presented with minimal overlap between each other, to increase diversity on the page and maximize the number of unique keywords on the page.

In some embodiments, related themes are provided as links in a sub-window (e.g., such as sub-window 702). In some embodiments, these are links to other thematic pages that are relevant to the present page (e.g., web page 700). For example, users can navigate to related content and explore additional products and themes that are related to the present thematic page. Also, these links are crawlable and, thus, can help search engines discover other thematic pages. In some embodiments, these links are computed based on product relevancy and product overlap (e.g., and can also be presented in a "Related Searches" widget).

In some embodiments, related searches are provided as links in a sub-window (e.g., such as sub-window 702). In some embodiments, these are links to other search results pages that are relevant to this page. For example, the related searches can suggest searches that are common on the site related to the given theme. Also, these links can help search engines discover other search pages, and these links can bring in valuable and relevant content onto the given page. In some embodiments, these links are computed based on product relevancy and product overlap; and these searches are typically high frequency (e.g., and can also be presented in a "Related Searches" widget).

In some embodiments, "More Results" are provided as links in a sub-window (e.g., such as sub-window 702). In some embodiments, these are links to (1) other Thematic Pages, if they exist, or (2) search results pages if there are no relevant Thematic Pages. For example, these links allow users to further explore the assortment of products presented in the "Top Refinements" sub-themes. Also, these links can facilitate crawling by search engines to search other pages and thematic pages for the web site.

Figure 8:
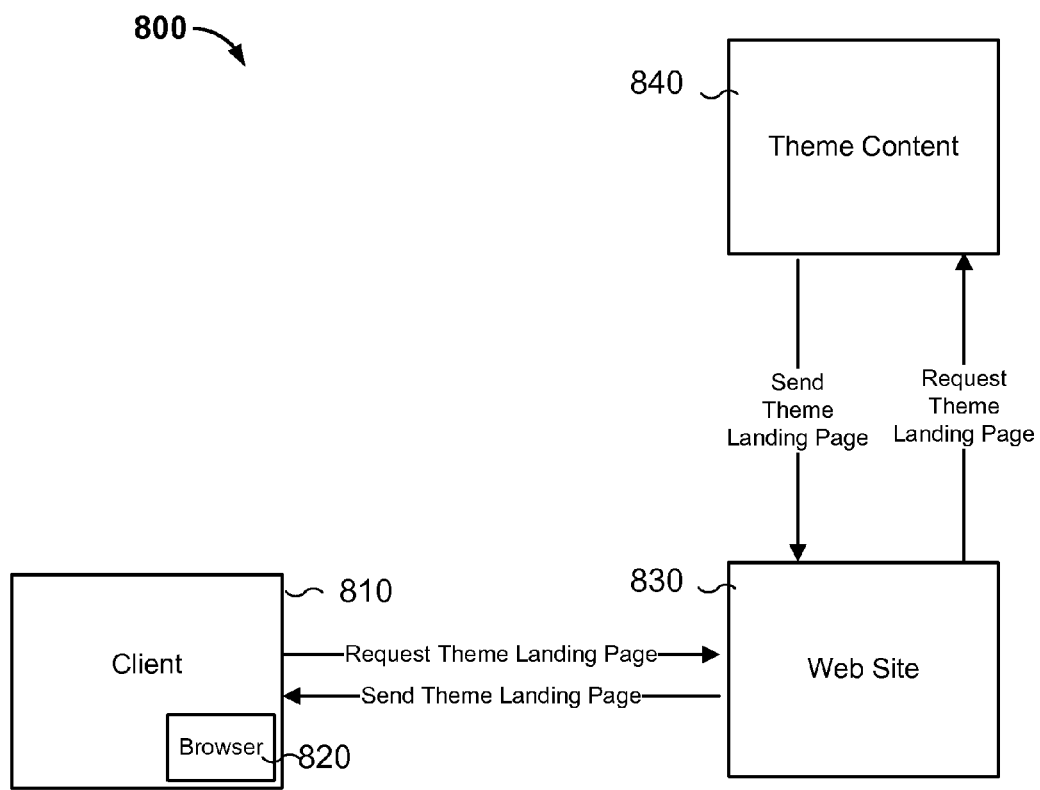
FIG. 8 is a network architecture for generating content for topics based on user demand in accordance with some embodiments.

FIG. 8 is a network architecture for generating content for topics based on user demand in accordance with some embodiments. As shown, a client device 810 that executes a web browser 820 is in network communication with a web site 830 (e.g., a server or appliance or other web or cloud based network service that services requests for the web site). In particular, the client browser 820 requests a theme landing page (e.g., a web page that is optimized for a particular theme). The web site 830 determines that the request includes a request for a landing page for a theme. In some embodiments, the web site 830 determines whether a copy of the landing page for the theme has been locally cached. Assuming that the web site does not have a local copy of the landing page for the theme, the web site 830 submits a request for the landing page for the theme to a theme content service 840 (e.g., a server or appliance or other web or cloud based network service that services requests for theme landing pages for the web site). The theme content service 840 returns the landing page for the theme to the web site 830, which then sends the landing page for the theme to the browser 820 (e.g., which can render the landing page for the theme for display by the client device 810).

In some embodiments, a web site includes links to theme based landing pages for the web site (e.g., links to thematic pages). For example, when a user clicks a link to a thematic page, the exact URL pattern used can take several forms (e.g., http://www.<merchant>.com/<page_name>-th.html). The web site server can extract the page_name field from the URL (e.g., as indicated in the above example) and can construct a fetch_thematic API call to a third party theme content service (e.g., the remote API can require an HTTP GET request that specifies, and possibly authenticates the authorized web site requester using a private key, and also possibly utilizes a variable number of HTTP parameters escaped using URL percent-encoding conventions, the requesting web site and the requested thematic page) that services thematic page requests for the web site (e.g., in other examples, the thematic page requests can be serviced by the web site server or another service managed by the web site operator). The third party theme content service can then return the requested thematic page (e.g., return the HTML for the requested thematic page, possibly inside returning the HTML that should be used to construct the thematic page by placing the returned HTML inside a thematic page template). The web site server can then construct the thematic page using the returned HTML page, and possibly some additional boilerplate, and can then return the requested constructed thematic page to the requesting user's client browser. In some embodiments, the web site server caches the thematic pages (e.g., for a one day period of time, or another period of time or based on an event occurrence).

Figure 9:
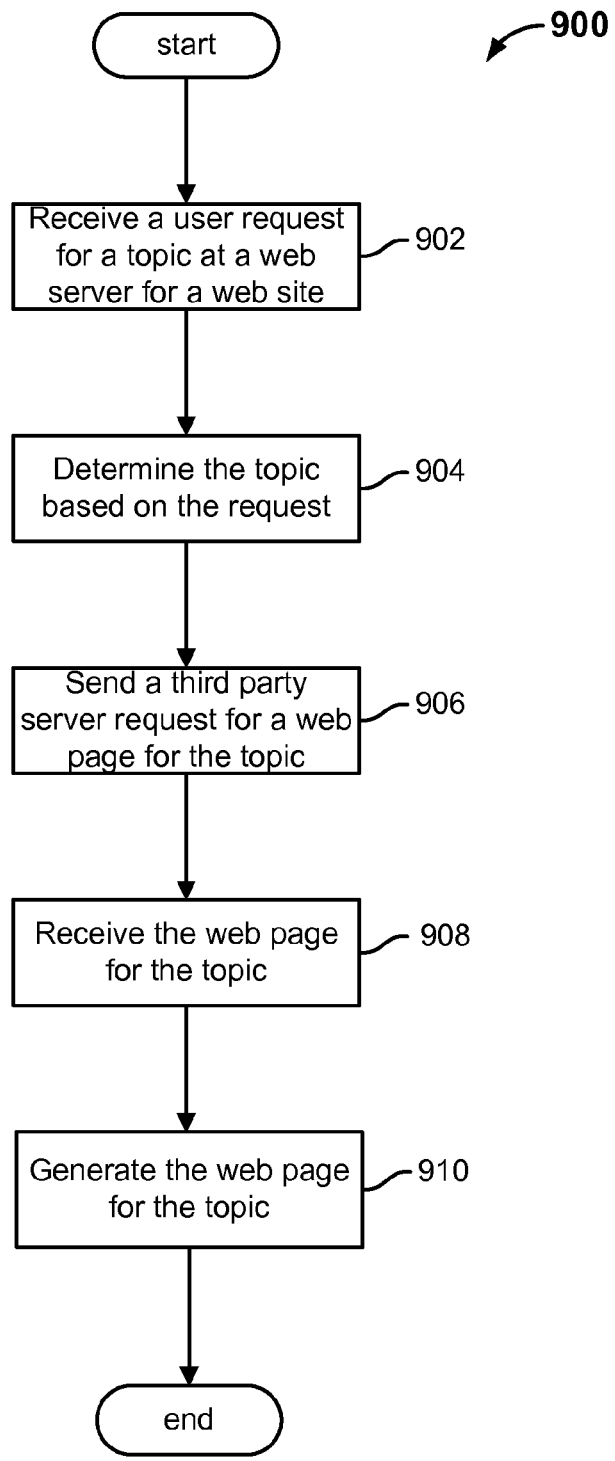
FIG. 9 is another flow diagram for generating content for topics based on user demand in accordance with some embodiments.

FIG. 9 is another flow diagram for generating content for topics based on user demand in accordance with some embodiments. At 902, a user request for a topic (e.g., theme or sub-theme) is received at a web server for a web site. At 904, the topic is determined based on the request. At 906, a third party server request for a web page for the topic is sent. At 908, the web page for the topic is received at the web server for the web site. At 910, the web page for the topic is generated at a client device browser. In some embodiments, a source of the web page for the topic is transparent to a web crawler.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
determine a topic based on a user demand, wherein determining the topic comprises:
determine frequencies of phrases based on an analysis of a search query log from a web site, a search query log from a search engine, or a combination thereof;
compare the frequencies of the phrases to a predetermined threshold;
determine at least one theme based on phrases having frequencies exceeding the predetermined threshold;
sort the at least one theme based on common words in the phrases;
cluster the at least one theme; and
determine the topic based on the clustered at least one theme;
automatically generate content for the topic, wherein the content is configured or organized differently than on other web pages of the web site; and
select the content that is contextually relevant for display within a corpus of content,
wherein the corpus of content includes a web site, a user's social networking web page, content customized for mobile devices, content customized based on location awareness, or an electronic mail message; and
a memory coupled to the processor and configured to provide the processor with instructions.

2. The system recited in claim 1, wherein the content is optimized for the topic.

3. The system recited in claim 1, wherein the content is displayed in a module of the corpus of content that includes a plurality of modules, and wherein each module includes dynamically generated contextually relevant content.

4. The system recited in claim 1, wherein select the content that is contextually relevant for display with the corpus of content further comprises determining the content based on a source of the user.

5. The system recited in claim 1, wherein select the content that is contextually relevant for display with the corpus of content further comprises personalizing the content based on user related data.

6. The system recited in claim 1, wherein select the content that is contextually relevant for display with the corpus of content further comprises determining a placement of the content for integration with a structure or organization of the corpus of content.

7. The system recited in claim 1, wherein the corpus of content includes the web site, and wherein the content includes contextually relevant data that does not exist on the other web pages of the web site.

8. The system recited in claim 1, wherein the content is selected for display in a plurality of modules, and wherein the processor is further configured to:
display performance metrics associated with each of the plurality of modules, and wherein each of the plurality of modules can be configured or automatically removed based on the performance metrics.

9. The system recited in claim 1, wherein the content is selected for display in a plurality of modules, and wherein the processor is further configured to:
 determine performance metrics associated with the plurality of modules; and
 automatically modify each of the plurality of modules based on the performance metrics.

10. The system recited in claim 1, wherein the content is selected for display in a plurality of modules, and wherein the processor is further configured to:
 determine performance metrics associated with the plurality of modules; and
 determine a charge for using each of the plurality of modules based on the performance metrics associated with each of the plurality of modules.

11. The system recited in claim 1, wherein the processor is further configured to:
 analyze an external data source to determine the topic based on the user demand, wherein the external data source includes social networking resources associated with the web site and includes social networking resources that include content that is similar to content included on the web site.

12. The system recited in claim 1, wherein the processor is further configured to:
 analyze user behavior to determine topics based on user demand, wherein the analyzed user behavior includes user search behavior performed on other web sites.

13. The system recited in claim 1, wherein the corpus of content includes a web site, wherein a landing page of the web site includes the content, and wherein the processor is further configured to:
 generate a plurality of configuration of modules for the topic for the web site, wherein each of the plurality of configuration of modules is optimized for a referring source of user and a display device type.

14. The system recited in claim 1, wherein the corpus of content includes a web site, wherein a landing page of the web site includes the content, and wherein the processor is further configured to:
 add a link on the web site for the topic, wherein the link is associated with the landing page, and wherein the link is crawlable by a web crawler.

15. The system recited in claim 1, wherein the processor is further configured to:
 automatically anticipate the user demand.

16. The system recited in claim 1, wherein determining the topic further includes identifying products related to the topic.

17. The system recited in claim 1, wherein the processor is further configured to:
 automatically anticipate the user demand based on current events, dates, special dates associated with a user, seasons, holidays, or any combination thereof.

18. The system recited in claim 1, wherein the processor is further configured to:
 analyze user behavior to determine topics based on user demand, wherein the analyzed user behavior includes user search history, user purchase history, user device preference, user presentation preferences, content generated using pixel log related data, user reviews, social networking related data, visited information, or any combination thereof.

19. The system recited in claim 1, wherein the processor is further configured to:
 determine that the web site does not include existing content for the topic; and
 automatically generate a landing page for the topic.

20. The system recited in claim 1, wherein the processor is further configured to:
 determine that the web site does not include existing content for the topic;
 automatically generate a landing page for the topic for the web site; and
 automatically add a link to the landing page to the web site.

21. A method, comprising:
 determining, using a processor, a topic based on a user demand, wherein determining the topic comprises:
  determining frequencies of phrases based on an analysis of a search query log from a web site, a search query log from a search engine, or a combination thereof;
  comparing the frequencies of the phrases to a predetermined threshold;
  determining at least one theme based on phrases having frequencies exceeding the predetermined threshold;
  sorting the at least one theme based on common words in the phrases;
  clustering the at least one theme;
 automatically generating content for the topic using the processor, wherein the content is configured or organized differently than on other web pages of the web site; and
 selecting the content that is contextually relevant for display within a corpus of content using the processor,
 wherein the corpus of content includes a web site, a user's social networking web page, content customized for mobile devices, content customized based on location awareness, or an electronic mail message.

22. A computer program product, the computer program product being embodied in a tangible non-transitory computer readable storage medium and comprising computer instructions for:
 determining a topic based on a user demand, wherein determining the topic comprises:
  determining frequencies of phrases based on an analysis of a search query log from a web site, a search query log from a search engine, or a combination thereof;
  comparing the frequencies of the phrases to a predetermined threshold;
  determining at least one theme based on phrases having frequencies exceeding the predetermined threshold;
  sorting the at least one theme based on common words in the phrases;
  clustering the at least one theme; and
  determining the topic based on the clustered at least one theme;
 automatically generating content for the topic, wherein the content is configured or organized differently than on other web pages of the web site; and
 selecting the content that is contextually relevant for display within a corpus of content,
 wherein the corpus of content includes a web site, a user's social networking web page, content customized for mobile devices, content customized based on location awareness, or an electronic mail message.

23. A system, comprising:
a processor configured to:
 receive a user request for a topic at a web server for a web site, wherein the topic is indicated as a linked topic on a web page of the web site;
 determine the topic based on the user request, wherein determining the topic comprises:

determine frequencies of phrases based on an analysis of a search query log from a web site, a search query log from a search engine, or a combination thereof;

compare the frequencies of the phrases to a predetermined threshold;

determine at least one theme based on a set of phrases having frequencies exceeding the predetermined threshold;

sort the at least one theme based on common words in the phrases;

cluster the at least one theme; and determine the topic based on the clustered at least one theme;

send a server request for a web page for the topic to a third party server;

receive the web page for the topic from the third party server; and generate the web page for the topic, wherein content of the web page is configured or organized differently than on other web pages of the web site;

wherein a corpus of content includes a web site, a user's social networking web page, content customized for mobile devices, content customized based on location awareness, or an electronic mail message; and wherein a source of the web page for the topic is transparent to a web crawler; and a memory coupled to the processor and configured to provide the processor with instructions.

24. The system recited in claim 23, wherein the server request is communicated using an application programming interface.

25. The system recited in claim 23, wherein the processor is further configured to:

send the web page for the topic to a requesting user browser; and cache the web page for the topic for a period of time or until an event occurrence.

* * * * *